_United States Patent Office_

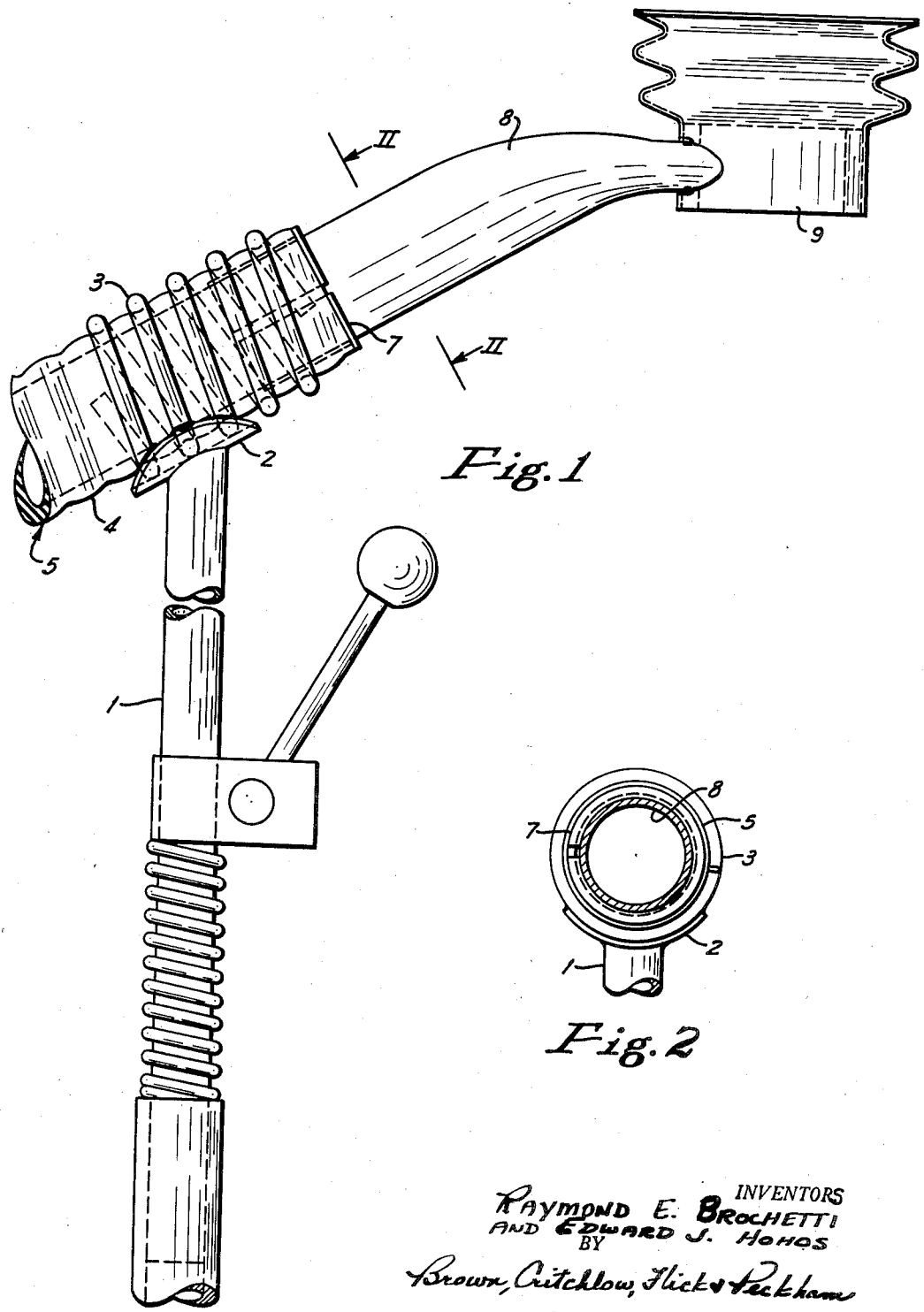

2,829,908
Patented Apr. 8, 1958

2,829,908

ROCK DUST COLLECTING APPARATUS

Raymond E. Brochetti, Churchill Borough, and Edward J. Hohos, Penn Township, Pa., assignors to Mine Safety Appliances Company, Pittsburgh, Pa., a corporation of Pennsylvania Application March 8, 1956, Serial No. 570,304

4 Claims. (Cl. 285—61)

This invention relates to dust collecting apparatus for mine roof drilling and the like, and more particularly to means for supporting the dust collector head.

It is among the objects of this invention to provide dust collecting apparatus, in which the collecting head and the suction hose can be quickly and easily attached to and removed from their support, and in which the head is flexibly supported so that it can adjust itself to any required position.

In accordance with this invention, a heavy coil spring extends across the upper part of an upright support, to which a portion of the spring is rigidly fastened. A flexible portion of the spring projects laterally from the support. A flexible suction hose extends through the spring and is gripped therein, with the end of the hose encircled by the flexible portion of the spring. Mounted in only the flexibly supported end of the hose is a split sleeve which receives and frictionally grips the outer end of a collecting head outlet conduit. Consequently the conduit is flexibly supported by the flexible portion of the spring. The hose is generally the type that includes a helical reinforcement that forms an enlargement extending around the hose. In such cases the pitch of the spring is made the same as the pitch of the enlargement, so that the hose can be screwed into the spring.

The preferred embodiment of the invention is illustrated in the accompanying drawings, in which—

Fig. 1 is a fragmentary side view of my dust collecting apparatus; and

Fig. 2 is a cross section taken on the line II—II of Fig. 1.

Referring to the drawings, a jack 1, or any other type of suitable support known in this art is provided at its upper end with a small concave saddle plate 2, preferably inclined. Seated on this plate is the lower end portion of a heavy coil spring 3 having spaced convolutions that fit the curvature of the saddle. The convolutions that engage the saddle are welded to it. The convolutions forming the rest of the spring extend laterally away from the saddle plate and are unconfined. The pitch of the spring is the same as the pitch of an enlargement or bead 4 extending helically around a conventional flexible suction hose 5, the enlargement being formed in a well-known manner from a reinforcing wire or the like embedded in the wall of the hose. The upper end of the hose can be retained securely in the spring by screwing the hose into the spring, which will extend around the hose between the convolutions of the reinforcing bead.

The end of the hose preferably extends a short distance beyond the upper or flexible end of the spring. Inserted in that end of the hose is a flanged split metal sleeve 7, which extends only through the flexible portion of the spring. The sleeve is retained in the hose by its frictional engagement with it. The sleeve forms a bushing for the end of the hose and permits the outer end of a dust collector head outlet conduit 8 to be easily inserted in the end of the hose. That is, the metal conduit will slide easily into the metal sleeve, expanding the sleeve a slight amount in doing so. The resistance of the hose and encircling spring to such expansion causes the sleeve to frictionally grip the conduit and securely hold it. Nevertheless, since the end of the hose that supports the conduit is disposed in the flexible portion of the spring, the dust collecting head 9 at the opposite end of the conduit can be swung about in any direction to adjust itself to the position of the drill stem (not shown) that extends through it in a well-known manner. Thus, the collector head is firmly but flexibly supported by the jack. It can be quickly disconnected from the jack by pulling conduit 8 out of the split sleeve, and then the hose can be removed from the spring.

Although the sleeve 7 is highly desirable, there may be cases where it is not necessary, and yet most of the advantages of this invention will still be attainable.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. In dust collecting apparatus for mine roof drilling, an upright support, a short and relatively stiff coil spring extending across the upper part of said support, the spring having a portion rigidly secured to the support and a flexible portion projecting only a few turns laterally from the support, a flexible suction hose extending through the spring and gripped therein with the end of the hose encircled by said flexible portion, a split sleeve mounted in only said end of the hose, and a collecting head outlet conduit having an outer end fitting in said sleeve and frictionally gripped by it, whereby said conduit is flexibly supported by said portion of the spring.

2. In dust collecting apparatus for mine roof drilling, an upright support, a short and relatively stiff coil spring extending across the upper part of said support, the spring having a portion rigidly secured to the support and a flexible portion projecting only a few turns laterally from the support, a flexible suction hose provided with helical reinforcing that forms an enlargement extending helically around the hose, the pitch of said spring being the same as the pitch of said enlargement, the hose extending through the spring and gripped thereby between the convolutions of said enlargement and with the end of the hose encircled by said flexible portion of the spring, a split sleeve mounted in only said end of the hose, and a collecting head outlet conduit having an outer end fitting in said sleeve and frictionally gripped by it, whereby said conduit is supported by said portion of the spring.

3. In dust collecting apparatus for mine roof drilling, an upright support, a short and relatively stiff straight coil spring extending across the upper part of said support, the spring having a portion rigidly secured to the support and a flexible portion projecting only a few turns laterally from the support, a flexible suction hose extending through the spring and gripped therein with the end of the hose encircled by said flexible portion, and a split sleeve mounted in only said end of the hose and adapted to receive and frictionally grip the outer end of a collecting head outlet conduit.

4. In dust collecting apparatus for mine roof drilling, an upright support, a short and relatively stiff coil spring extending across the upper part of said support, the spring having a portion rigidly secured to the support and a flexible portion projecting only a few turns laterally from the support, a flexible suction hose extending through the spring and gripped therein with the end of the hose encircled by said flexible portion, and a collecting head outlet conduit having an outer end mounted in only said end of the hose, whereby said conduit is supported by said flexible portion of the spring.

References Cited in the file of this patent

UNITED STATES PATENTS

| | | |
|---|---|---|
| 972,372 | Harding | Oct. 11, 1910 |
| 1,279,785 | Styles | Sept. 24, 1918 |
| 1,861,532 | Hough | June 7, 1932 |
| 2,378,174 | Beede | June 12, 1945 |

FOREIGN PATENTS

| | | |
|---|---|---|
| 429,643 | Italy | Feb. 2, 1948 |